F. Layaux,

Valance.

No. 106,842.   Patented Aug. 30, 1870.

Witnesses
H. J. Aretz
Thos. D. D. Durand

F. Layaux, Inventor
by Munn & Co.
his Attorneys

United States Patent Office.

FRANCIS LAYAUX, OF MONROE, LOUISIANA.

Letters Patent No. 106,842, dated August 30, 1870.

IMPROVEMENT IN BEDSTEAD-TESTER.

The Schedule referred to in these Letters Patent and making part of the same.

To all whom it may concern:

Be it known that I, FRANCIS LAYAUX, of Monroe, in the parish of Ouachita and State of Louisiana, have invented a new and improved Tester or Attachment for Bedsteads for Supporting Mosquito-Nets; and I do hereby declare the following to be a full, clear, and exact description of the same, reference being had to the accompanying drawing making a part of this specification, in which—

Figure 1:
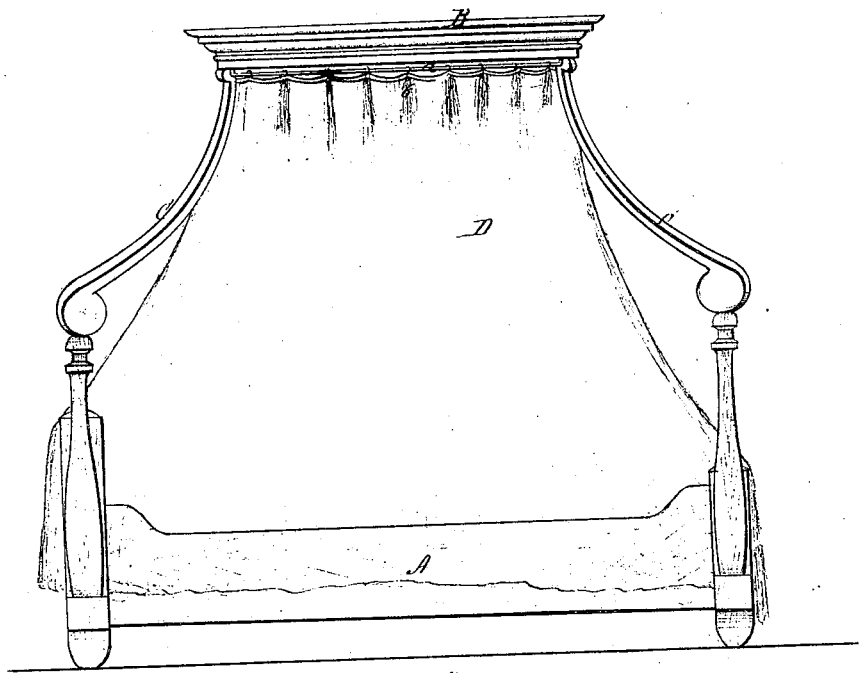
Figure 1 is a side elevation.
Figure 2:
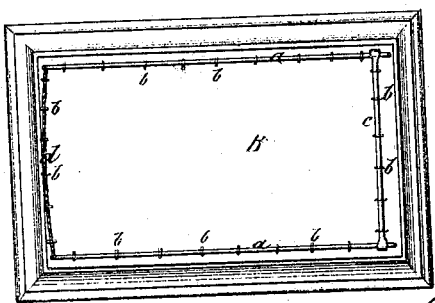
Figure 2 is a plan view of the under side of the tester, showing the guide-rods and sliding bar.

This invention has for its object the folding of a mosquito-net into a small compass for the purpose of keeping it out of the way when the bed over which it is hung is not in use, and the expansion of the net to its full size when the bed is to be occupied.

The invention consists in a tester to which two rods are attached beneath, one at each side, on which rods are placed sliding rings to which the upper edges of the net are fastened, there being also a cross-bar that slides on the two side rods, on which bar are also placed some of the net rings, the whole arrangement being such that when the cross-bar is moved on the side rods to one end of the tester, the net is folded together, and when the cross-bar is moved to the opposite end of the tester, the net is expanded.

In the drawing—

A is a bedstead;

B, the tester; and

C, the posts which support the tester.

D is the net.

$a$, the side rods fastened to the tester beneath.

$b$, the net rings.

$c$, the sliding cross-bar.

$d$, a stationary cord, connecting the side rods at their ends, and supporting part of the net-rings.

In the drawing the net is shown as expanded to its full size. As may be readily seen from an inspection of the figures, if the bar $c$ be slid toward the cord $d$, the net will be folded together.

The cheapness, simplicity, and effectiveness of this arrangement are evident.

Having thus described my invention,

What I claim as new, and desire to secure by Letters Patent, is—

The combination of the tester B, side rods $a$, and sliding bar $c$, substantially in the manner and for the purpose specified.

FRANCIS LAYAUX.

Witnesses:
JOHN RAY,
R. W. RICHARDSON.